United States Patent
Seidel (10) Patent No.: US 7,809,943 B2
(45) Date of Patent: Oct. 5, 2010

(54) METHOD AND SYSTEM FOR ESTABLISHING TRUST IN A PEER-TO-PEER NETWORK

(75) Inventor: Craig Howard Seidel, Palo Alto, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1248 days.

(21) Appl. No.: 11/236,048

(22) Filed: Sep. 27, 2005

(65) Prior Publication Data

US 2007/0074019 A1    Mar. 29, 2007

(51) Int. Cl.
*H04L 29/06*    (2006.01)
(52) U.S. Cl. ...................................... 713/164
(58) Field of Classification Search .................. 713/156
See application file for complete search history.

(56) References Cited

U.S. PATENT DOCUMENTS

| | | | |
|---|---|---|---|
| 4,790,017 A | 12/1988 | Hinton | |
| 5,437,050 A | 7/1995 | Lamb et al. | |
| 5,708,759 A | 1/1998 | Kemeny | |
| 5,848,396 A | 12/1998 | Gerace | |
| 5,914,714 A | 6/1999 | Brown | |
| 5,918,223 A | 6/1999 | Blum et al. | |
| 5,925,843 A | 7/1999 | Miller et al. | |
| 5,956,671 A | 9/1999 | Ittycheriah et al. | |
| 5,978,791 A | 11/1999 | Farber et al. | |
| 6,188,010 B1 | 2/2001 | Iwamura | |
| 6,415,280 B1 | 7/2002 | Farber et al. | |
| 6,502,125 B1 | 12/2002 | Kenner et al. | |
| 6,553,403 B1 | 4/2003 | Jarriel et al. | |
| 6,625,643 B1 | 9/2003 | Colby et al. | |
| 6,665,726 B1 | 12/2003 | Leighton et al. | |
| 6,678,680 B1 | 1/2004 | Woo | |
| 6,708,212 B2 | 3/2004 | Porras et al. | |
| 6,732,180 B1 | 5/2004 | Hale et al. | |
| 6,799,221 B1 | 9/2004 | Kenner et al. | |
| 6,826,546 B1 | 11/2004 | Shuster | |
| 6,892,227 B1 | 5/2005 | Elwell et al. | |

(Continued)

FOREIGN PATENT DOCUMENTS

FR    2816417 A1    5/2002

(Continued)

OTHER PUBLICATIONS

Chawathe, Yatin, et al., "Making Gnutella-like P2P Systems Scalable", SIGCOMM '03, 'Online!, Aug. 25, 2003, XP002315870, Karlsruhe, Germany, pp. 407-418.

(Continued)

*Primary Examiner*—Kambiz Zand
*Assistant Examiner*—Stephen Sanders
(74) *Attorney, Agent, or Firm*—Dana Zottola; Andy T. Pho (57) ABSTRACT

A method and system for establishing trust in a peer-to-peer network is disclosed. According to one embodiment, a computer implemented method comprises receiving a certificate associated with content from a peer in a peer-to-peer network. A file certificate associated with the content is received wherein the file certificate includes a hash. The validity of the content is determined with the file certificate. The authenticity of the content is determined with the file certificate.

24 Claims, 7 Drawing Sheets

U.S. PATENT DOCUMENTS

| | | |
|---|---|---|
| 6,947,386 B2 | 9/2005 | Temudo de Castro et al. |
| 6,981,180 B1 | 12/2005 | Bailey et al. |
| 7,020,701 B1 | 3/2006 | Gelvin et al. |
| 7,100,199 B2 | 8/2006 | Ginter et al. |
| 7,111,061 B2 | 9/2006 | Leighton et al. |
| 7,120,800 B2 | 10/2006 | Ginter et al. |
| 7,136,922 B2 | 11/2006 | Sundaram et al. |
| 7,143,170 B2 | 11/2006 | Swildens et al. |
| 7,155,723 B2 | 12/2006 | Swildens et al. |
| 7,185,052 B2 | 2/2007 | Day |
| 7,194,522 B1 | 3/2007 | Swildens et al. |
| 7,203,753 B2 | 4/2007 | Yeager et al. |
| 7,313,619 B2 | 12/2007 | Torrant et al. |
| 7,356,487 B2 | 4/2008 | Kitze |
| 7,363,278 B2 | 4/2008 | Schmelzer et al. |
| 7,376,749 B2 | 5/2008 | Loach et al. |
| 7,409,644 B2 | 8/2008 | Moore et al. |
| 7,490,149 B2 | 2/2009 | Omote et al. |
| 2001/0037314 A1 | 11/2001 | Ishikawa |
| 2002/0065880 A1 | 5/2002 | Hasegawa et al. |
| 2002/0082999 A1 | 6/2002 | Lee et al. |
| 2002/0083060 A1 | 6/2002 | Wang et al. |
| 2002/0087885 A1 | 7/2002 | Peled et al. |
| 2002/0099955 A1 | 7/2002 | Peled et al. |
| 2002/0120859 A1 | 8/2002 | Lipkin et al. |
| 2002/0141387 A1 | 10/2002 | Orshan |
| 2002/0143894 A1 | 10/2002 | Takayama |
| 2002/0152173 A1* | 10/2002 | Rudd ............... 705/57 |
| 2002/0152261 A1 | 10/2002 | Arkin et al. |
| 2002/0152262 A1 | 10/2002 | Arkin et al. |
| 2002/0174216 A1 | 11/2002 | Shorey et al. |
| 2002/0194108 A1 | 12/2002 | Kitze |
| 2003/0023421 A1 | 1/2003 | Finn et al. |
| 2003/0028889 A1 | 2/2003 | McCoskey et al. |
| 2003/0056118 A1 | 3/2003 | Troyansky et al. |
| 2003/0061287 A1 | 3/2003 | Yu et al. |
| 2003/0061490 A1 | 3/2003 | Abajian |
| 2003/0070070 A1* | 4/2003 | Yeager et al. ............... 713/157 |
| 2003/0093794 A1 | 5/2003 | Thomas et al. |
| 2003/0095660 A1 | 5/2003 | Lee et al. |
| 2003/0097299 A1 | 5/2003 | O'Kane et al. |
| 2003/0135548 A1 | 7/2003 | Bushkin |
| 2003/0233541 A1 | 12/2003 | Fowler et al. |
| 2003/0236787 A1 | 12/2003 | Burges |
| 2004/0010417 A1 | 1/2004 | Peled |
| 2004/0030691 A1 | 2/2004 | Woo |
| 2004/0030743 A1* | 2/2004 | Hugly et al. ............... 709/203 |
| 2004/0031038 A1* | 2/2004 | Hugly et al. ............... 719/315 |
| 2004/0093354 A1 | 5/2004 | Xu et al. |
| 2004/0103280 A1 | 5/2004 | Balfanz et al. |
| 2004/0107215 A1 | 6/2004 | Moore et al. |
| 2004/0111604 A1 | 6/2004 | Fournier |
| 2004/0139329 A1 | 7/2004 | Abdallah et al. |
| 2004/0158546 A1 | 8/2004 | Sobel et al. |
| 2004/0181688 A1 | 9/2004 | Wittkotter |
| 2005/0075119 A1 | 4/2005 | Sheha et al. |
| 2005/0089014 A1 | 4/2005 | Levin et al. |
| 2005/0091167 A1 | 4/2005 | Moore et al. |
| 2005/0105476 A1 | 5/2005 | Gotesdyner et al. |
| 2005/0108378 A1 | 5/2005 | Patterson et al. |
| 2005/0114709 A1 | 5/2005 | Moore |
| 2005/0147044 A1 | 7/2005 | Teodosiu et al. |
| 2005/0154681 A1 | 7/2005 | Schmelzer |
| 2005/0198317 A1 | 9/2005 | Byers |
| 2005/0198535 A1 | 9/2005 | Basche et al. |
| 2005/0203851 A1 | 9/2005 | King et al. |
| 2005/0216433 A1 | 9/2005 | Bland et al. |
| 2005/0265367 A1 | 12/2005 | Teodosiu et al. |
| 2005/0267945 A1 | 12/2005 | Cohen et al. |
| 2006/0015936 A1* | 1/2006 | Illowsky et al. ............... 726/18 |
| 2006/0149806 A1 | 7/2006 | Scott et al. |
| 2007/0143405 A1 | 6/2007 | Bland et al. |

FOREIGN PATENT DOCUMENTS

| | | |
|---|---|---|
| WO | WO 01/11496 A2 | 2/2001 |
| WO | WO-01/50354 A1 | 7/2001 |
| WO | WO 01/77775 A2 | 10/2001 |
| WO | WO 02/075595 A1 | 9/2002 |
| WO | WO 02/077847 A1 | 10/2002 |
| WO | WO 02/082271 A1 | 10/2002 |
| WO | WO 2005/006157 A1 | 1/2005 |
| WO | WO 2005/043359 A1 | 5/2005 |
| WO | WO 2005/043819 A2 | 5/2005 |
| WO | WO 2005/046174 A1 | 5/2005 |
| WO | WO 2005/084252 A2 | 9/2005 |
| WO | WO 2005/109179 A2 | 11/2005 |
| WO | WO 2006/041742 A2 | 4/2006 |
| WO | WO 2006/086158 A2 | 8/2006 |

OTHER PUBLICATIONS

Cuenca-Acuna, F M, et al., Autonomous Replication for High Availability in Unstructured P2P Systems, Reliable Distributed Systems, 2003. Proceedings. 22nd International Symposium on Oct. 6-8, 2003, Piscataway, NJ, USA, IEEE, Oct. 6, 2003, pp. 99-108.

Dias, D M, et al., A Scalable and Highly Available Web Server, Feb. 25, 1996, Digest Of Papers Of Compcon (Computer Society Conference) 1996 Technologies For The Information Superhighway. Santa Clara, Feb. 25-28, 1996, Digest Of Papers Of The Computer Society Computer Conference Compcon, Los Alamitos, IEEE Comp. Soc. Press, 8 pages.

Lee, C Y, Application of a cross decomposition algorithm to a location and allocation problem in distributed systems, Computer Communications, Elsevier Science Publishers BV, Amsterdam, NL, vol. 18, No. 5, May 1995, pp. 367-377.

Lichtman, D. Jacobson, D., Anonymity a Double-Edged Sword for Pirates Online, The Chicago Tribune, Apr. 13, 2000, 2 pages.

Neild, L L, et al., Investigating Peer-to-peer Systems for Resource Sharing within a Small Group of Nodes, Information Technology : Coding and Computing, 2004. Proceedings. ITCC 2004. International Conference On Las Vegas, NV, USA, Apr. 5-7, 2004, Piscataway, NJ, USA, IEEE, vol. 2, Apr. 5, 2004, pp. 400-404.

Oliveira, L B E, et al., Evaluation of Ad-Hoc Routing Protocols under a Peer-to-Peer Application, Mar. 16, 2003, Wireless Communications And Networking, 2003. WCNC 2003. 2003 IEEE Mar. 16-20, 2003, Piscataway, NJ, USA, IEEE, pp. 1143-1148.

Ozmutlu S, et al., A day in the life of Web searching : an exploratory study, Information Processing & Management Elsevier, Barking, GB, vol. 40, No. 2, Mar. 2004, pp. 319-345.

Pastor, L, et al., An Efficiency and Scalability Model for Heterogeneous Clusters, 42nd Annual Symposium On Foundations Of Computer Science. (FOCS 2001). Las Vegas, Oct. 14-17, 2001. Annual Symposium On Foundations Of Computer Science, Los Alamitos, CA : IEEE Comp. Soc, US, Oct. 8, 2001, pp. 427-434.

Schroeder, T, et al., Scalable Web Server Clustering Technologies, IEEE Network, IEEE Inc. New York, US, vol. 14, No. 3, May 2000, pp. 38-45.

PCT Search Report for PCT/GB 02/01347 dated Aug. 21, 2002, 2 pages.

PCT Search Report for PCT/US2004/029798 mailed Dec. 21, 2004, 2 pages.

PCT Search Report for PCT/US2004/029869 mailed Feb. 22, 2005, 2 pages.

PCT Search Report for PCT/US2004/029685 mailed Apr. 27, 2005, 3 pages.

PCT Search Report for PCT/US05/15643 mailed Jan. 13, 2006, 1 page.

Ito, Mabo Robert, et al., Zero-Crossing Measurements for Analysis and Recognition of Speech Sounds, IEEE Transactions on Audio and Electroacoustics, vol. AU-19, No. 3, Sep. 1971, pp. 235-242.

Patent Abstracts of Japan, Publication No. 2000-322080, Mitsubishi Electric Corp, published: Nov. 24, 2000, 1 pg.

Cuenca-Acuna, F., et al., Autonomous Replication for High Availability in Unstructured P2P Systems, Technical Report, Dept. of Computer Science, Rutgers University, Apr. 24, 2003, pp. 1-21.

Dijker, Barb, Re : [SAGE] IP Assignment Map ???, Aug. 20, 2001, http://www.sage.org/lists/sage-members-archive/2001/msg01063.html, pp. 1-2.

Hubbard, K., et al., RFC 2050, Obsoletes : 1466 : Internet Registry IP Allocation Guidelines, Nov. 1996, http://www.ietf.org/rfc/rfc2050.txt?number=2050, pp. 1-13.

Kedem, Benjamin., Spectral Analysis and Discrimination by Zero-Crossings, Proceedings Of The IEEE, IEEE, New York, NY, U.S.A., vol. 74, No. 11, Nov. 1, 1986, pp. 1477-1493.

Ooghe, Sven, et al., Impact of the Evolution of the Metropolitan Network on the DSL Access Architecture, IEEE Communications Magazine, Feb. 2003, pp. 140-145.

Parlante, Nick, IP Routing, Handout # 5, Spring, 2001-2002, Stanford, pp. 1-6.

Passarge, Elke, Layer 4 switching : The magic combination, Network World, Feb. 15, 1999, http://www.networkworld.com/newsletters/lans/0215lan1.html, pp. 1-3.

Rybczynski, Tony, Nortel : Layer 4 switching is an illusion, Network World, Feb. 8, 1999, http://www.networkworld.com/forum/0208layer4no.html, pp. 1-3.

Saunders, John, Real-Time Discrimination Of Broadcast Speech/Music, IEEE International Conference On Acoustics, Speech, And Signal Processing—Proceedings, (ICASSP), Atlanta, May 7-10, 1996 : [IEEE International Conference On Acoustics, Speech, And Siganl Processing—Proceedings. (ICASSP)], New York, NY, U.S.A. vol. 2, May 7, 1996, pp. 993-996.

Smith, Gavin, et al., Quick Audio Retrieval Using Active Search, Proc. Of 1998 IEEE ICASSP, May 12, 1998, vol. 6, pp. 3777-3780.

Socolofsky, T., et al., Request for Comments : 1180, A TCP/IP Tutorial, Jan. 1991, http://tools.ietf.org/html/rfc1180, pp. 1-28.

VPN—Virtual private Networking, an overview, Jan. 24, 2002, http://web.archive.org/web/20020124162522/http://homenethelp.com/vpn/, pp. 1-2.

Vishnumurthy, V., Karma: A Secure Economic Framework for Peer-to-Peer Resource Sharing, Department of Computer Science, Cornell University, Year: 2003; pp. 1-6.

\* cited by examiner

| Validated Content? | Content | Location | Size | Connection Speed |
|---|---|---|---|---|
| Y | Song 1 | Location 1 | 10K | 56K |
| Y | Video 1 | Location 2 | 15 MB | T1 |
| Y | File 1 | Location 3 | 5K | ADSL |
| N | Song 2 | Location 4 | 4.2 MB | ADSL |
| N | Song 3 | Location 5 | 5 MB | ADSL |
| N | Video 2 | Location 6 | 372 MB | ADSL |
| . . | | | | |

METHOD AND SYSTEM FOR ESTABLISHING TRUST IN A PEER-TO-PEER NETWORK

FIELD OF THE INVENTION

The field of the invention relates generally to computer systems and more particularly relates to a method and system for establishing trust in a peer-to-peer network.

BACKGROUND OF THE INVENTION

There are a number of different network types, but one prevalent form of network is the peer-to-peer network. A peer-to-peer network is one in which peer machines are networked together and maintain the state of the network via records on the participant machines. In peer-to-peer networks, each end node has broadly the same capabilities, and any node can initiate communications. Typical peer-to-peer networks lack a central server for administration, although hybrid networks do exist. So, generally speaking, the term peer-to-peer refers to a set of technologies that allows a group of computers to directly exchange data and/or services. The distinction between peer-to-peer networks and other network technologies is really more about how the member computers communicate with one another than about the network structure itself. For example, many peer-to-peer networks utilize the Internet for communications, but the Internet can also be used for other types of networking.

Figure 1:
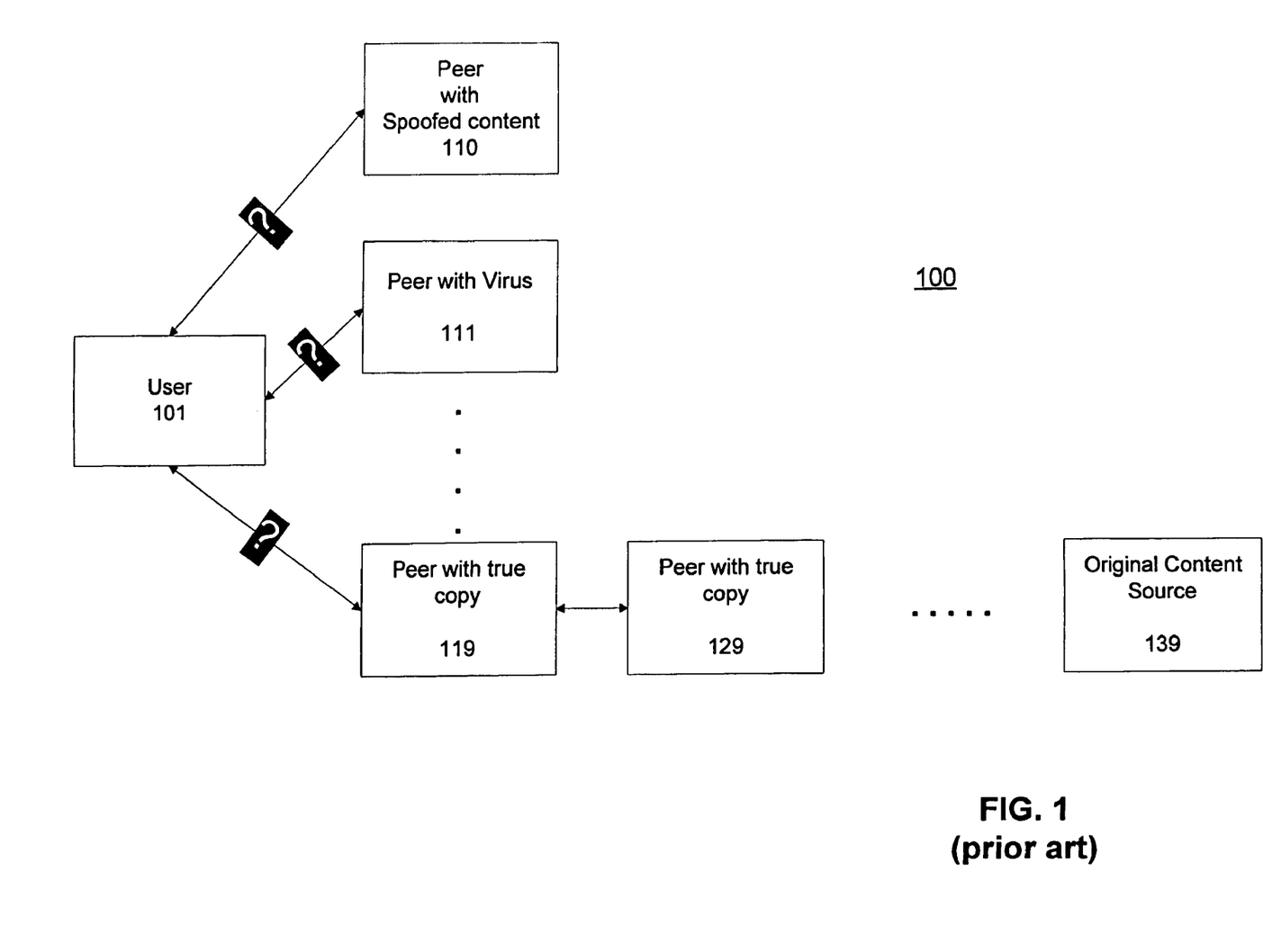
FIG. 1 illustrates a prior art peer-to-peer network.

FIG. 1 illustrates a prior art peer-to-peer network 100. Network 100 includes a user machine 101 which is a peer machine that desires content that originated from content source 139. User machine 101 includes a peer-to-peer client that facilitates file transfers with other peers in network 100, such as peers 110-119. Network 100 is capable of distributing and maintaining multiple copies of original content from content source 139 on peers 110-129. A problem with prior art peer-to-peer networks such as network 100, is that user 101 may falsely believe, through the peer-to-peer client, that the desired content is available from multiple peers 110-129. However, the user 101 is unaware (as signified by the question marks of FIG. 1) that not all peers 110-129 have actual copies of the desired content. For example, if user 101 requests the desired content from peer 110, peer 110 will send spoofed content to user 101. Or if user 101 requests the desired content from peer 111, peer 111 will send a virus to user 101. Even in the case where user 101 requests the desired content from peer 119, user 101 does not know if the content is an authentic copy of the content generated by content source 139.

SUMMARY

A method and system for establishing trust in a peer-to-peer network is disclosed. According to one embodiment, a computer implemented method comprises receiving a certificate associated with content from a peer in a peer-to-peer network. A file certificate associated with the content is received wherein the file certificate includes a hash. The validity of the content is determined with the file certificate. The authenticity of the content is determined with the file certificate.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

A method and system for establishing trust in a peer-to-peer network is disclosed. According to one embodiment, a computer implemented method comprises receiving a certificate associated with content from a peer in a peer-to-peer network. A file certificate associated with the content is received wherein the file certificate includes a hash. The validity of the content is determined with the file certificate. The authenticity of the content is determined with the file certificate.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
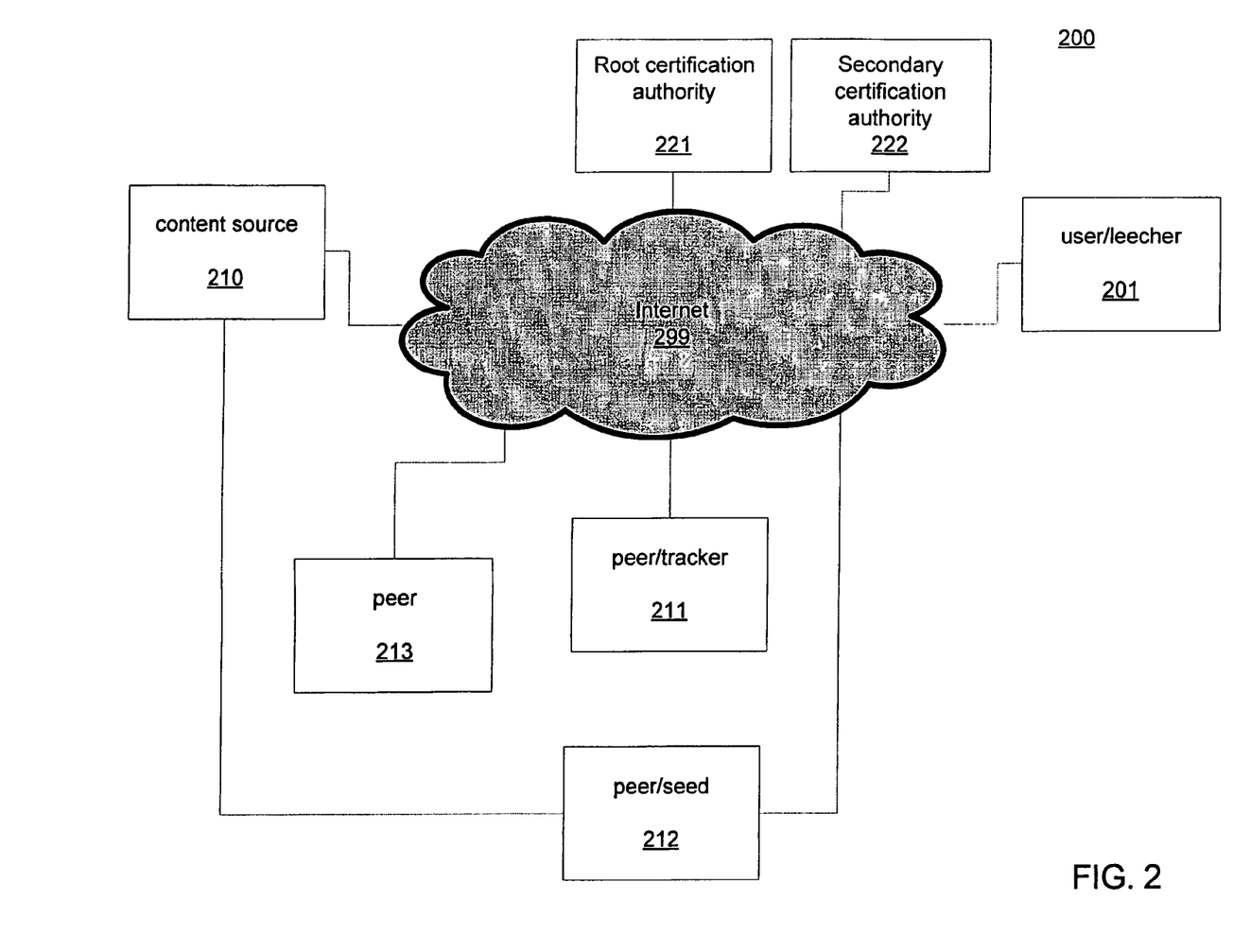
FIG. 2 illustrates a block diagram of an exemplary peer-to-peer network enabling trusted content, according to one embodiment of the present invention.

FIG. 2 illustrates a block diagram of an exemplary peer-to-peer network 200 enabling trusted content, according to one embodiment of the present invention. Network 200 is modeled after a distributed content system, such as offered by BitTorrent, Inc. In addition to a BitTorrent system, it is to be appreciated that other systems employing the various teachings herein may also be used to practice the various aspects of the present invention, and as such, are considered to be within its full scope.

Network 200 includes a user 201 (also known as a leecher), a peer that may also be a tracker 211, a peer that may also be a seed 212, a peer 213, a content source 210, and a certification authority 221. The peers 211-213, user 201, content source 210 and certification authority communicate via the Internet 299. Network 200 uses any one of a number of well-known protocols and/or applications including HyperText Transfer Protocol (HTTP), File Transfer Protocol (FTP), Internet Relay Chat (IRC), etc., via a TCP/IP connection or UDP/IP packets (not shown in this view) or some other connection well known in the art. Although the network 299 is described herein as being the Internet, alternatively, the network 299 may be a Wide Area Network (WAN), a Local Area Network (LAN), or any other system of interconnections enabling two or more computers to exchange information. Further, the network 299 may include a wireless network, such that one or more of client devices may be wireless devices.

In network 200, leecher 201 is a peer that does not have a complete copy of the desired content, yet. When downloading of the desired content from any source (including content source 210) is complete, leecher 201 may stay around and "seed" the file (desired content) as a seed so that others can complete their download. The term leecher is also used for peers that have very poor upload/download ratios or leave the network 200 immediately after their downloads are complete. According to one embodiment, leecher 201 desires content that originated at content source 210. Copies of the content may be available on multiple peers or "seeds," as described in greater detail below.

To share a file using network 200 a user creates a small "pointer" file that contains, at a minimum: a file identifier (e.g., file name), and the hash of each block in the file (which allows users to make sure they are downloading the real thing); and the address of a "tracker" server. In alternate embodiments the pointer file also contains the filename and filesize. The pointer file can then be distributed to other users, such as peers 211-213, often via email or placed on a website. The peer is then started as a "seed node", such as peer/seed 212, allowing other users/peers to connect and commence downloading. When other peers finish downloading the entire file, they can optionally "reseed" it—thus, becoming an additional source for the file. A tracker, such as peer/tracker 211, is a broker service that mediates contacts between peers. The tracker is not directly involved in the data transfer and does not have a copy of the file.

Each user 201 who wants to download the file first downloads the pointer file and opens it in client software. The pointer file tells user 201 the address of the tracker 211, which, in turn, maintains a log of which users are downloading the file and where the file and its fragments reside. For each available source, the client software considers which blocks of the file are available and then requests the rarest block it does not yet have. This makes it more likely that peers 211-213 will have blocks to exchange. As soon as the client software finishes importing a block, it hashes that block and compares this hash to the hash in the pointer file to make sure that the block matches what the pointer file said it should be. Then it begins looking for another user to upload the block to.

Content source 210 may represent a business or individual that has generated content that will be distributed. The content may be data files, music files (MP3s), video files, software or any similarly reproducible content. The certification authority 221 is a trusted source (such as Intertrust, Cybertrust, Certicom, Entrust, GeoTrust, QuoVadis, Verisign, etc.) that issues root certificates used to develop a chain of trust between an end user (such as user 201) and the certification authority 221. The certification authority 221 will also validate, by signing, authorized parties' certificates. Prior to content being prepared for initial distribution in network 200, content source 210 contacts the certification authority 221 to issue certificates of authenticity for that content source 210. More "links" in the chain of trust are established through multiple layers of certification authorities. Furthermore, there may be multiple root certification authorities 221. The chain of trust must be unbroken between a root certification authority 221 and the content source 210 making the content available. Independent of the transfer of the content to users (such as user 201) client software will obtain the root certificate from the certification authority 221 or from a third party. The root certificates are stored on the user's systems for future use, usually within Internet browsers, such as Microsoft Internet Explorer.

Figure 3:
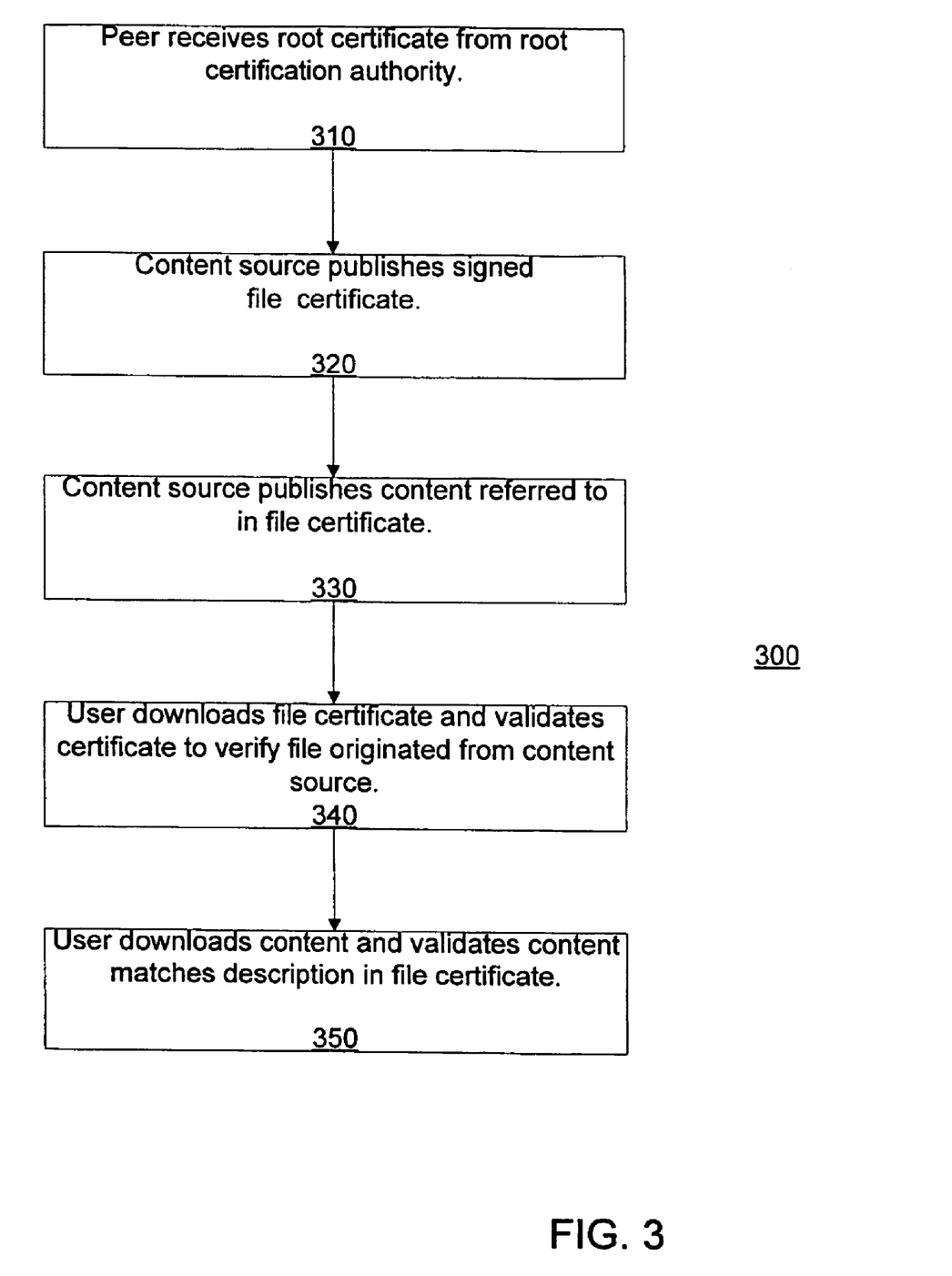
FIG. 3 illustrates a flow chart of an exemplary process for verifying the authenticity of content's origin in a peer-to-peer network, according to one embodiment of the present invention.

FIG. 3 illustrates a flow chart of an exemplary process 300 for verifying the authenticity of content's origin in a peer-topeer network, according to one embodiment of the present invention. Although described in view of a BitTorrent system, any peer-to-peer system is considered to be within the scope of the present process. A .torrent file may be considered to be one type of pointer file. Process 300 allows for a peer (such as user 201) to receive a root certificate from a certification authority 221. (310) A content source 210 publishes a file along with a file certificate. (320) The content source 210 publishes the content referred to in the file certificate. (330) The content may be copied to numerous peers. Any peer that has the content and has maintained a chain of authenticity leading back to the content source 210 can serve the content. User 201 downloads the pointer file from a peer and validates the pointer file by authenticating a certificate from the peer providing the pointer file. (340) The user 201 downloads the content and validates the content according to the information stored in the file certificate. (350)

Figure 4:
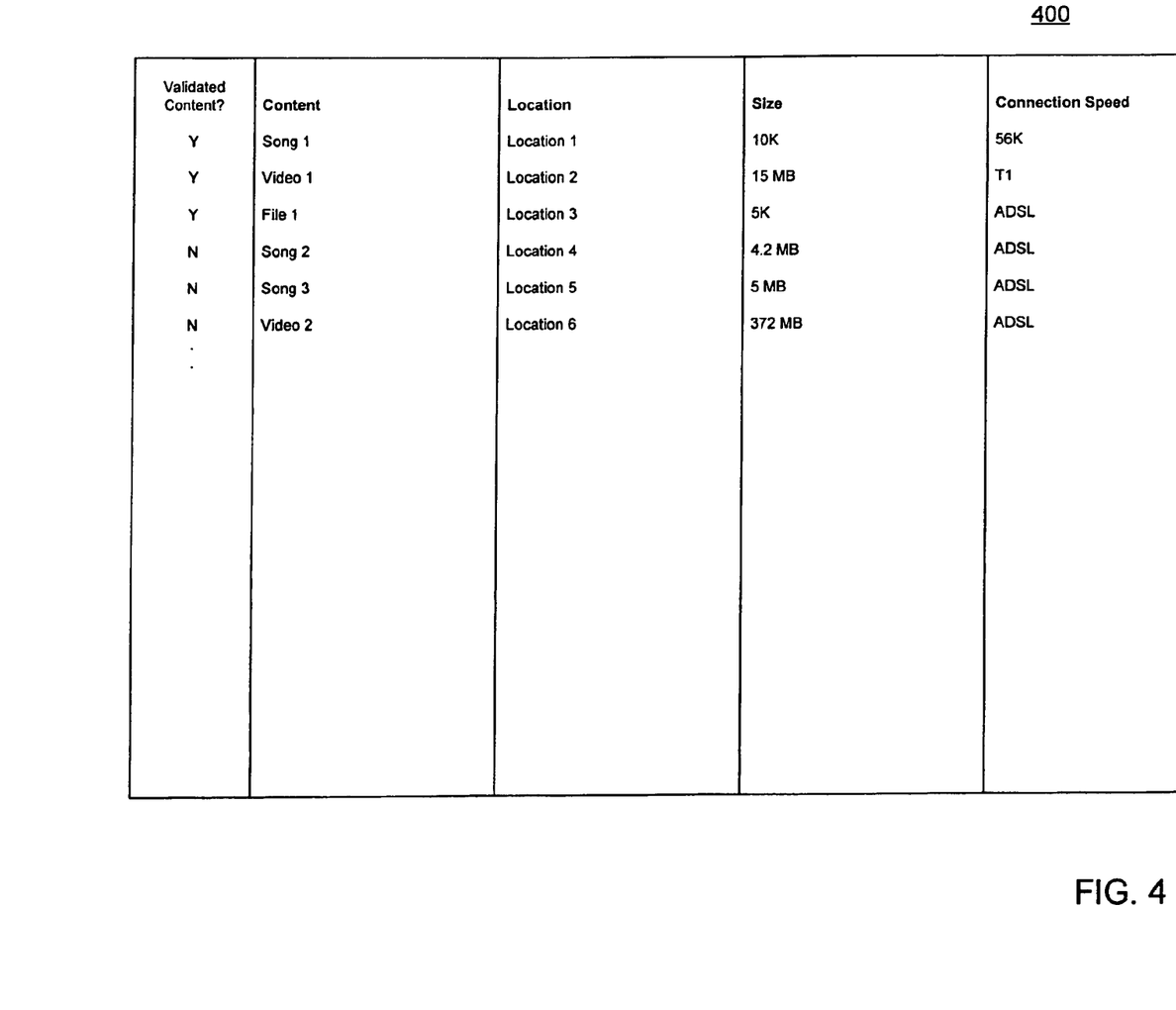
FIG. 4 illustrates a block diagram of an exemplary graphical user interface, according to one embodiment of the present invention.

FIG. 4 illustrates a block diagram of an exemplary graphical user interface 400, according to one embodiment of the present invention. Graphical user interface 400 may be provided by client software residing on user computers such as user 201, and peers 211-213. Using interface 400, a user may search for content within peer-to-peer network 200, for example any file related to *Speed of Sound*© by Coldplay™. Interface 400 illustrates the connection speed at which the content may be downloaded, the size of the file, the location of the file, the name of the content, and whether or not the content has come from a trusted source. For example, Song 1, Video 1, and File 1 are available from Locations 1-3, respectively and have been authenticated using the present chain of trust process, such as described above in FIG. 3.

Figure 5:
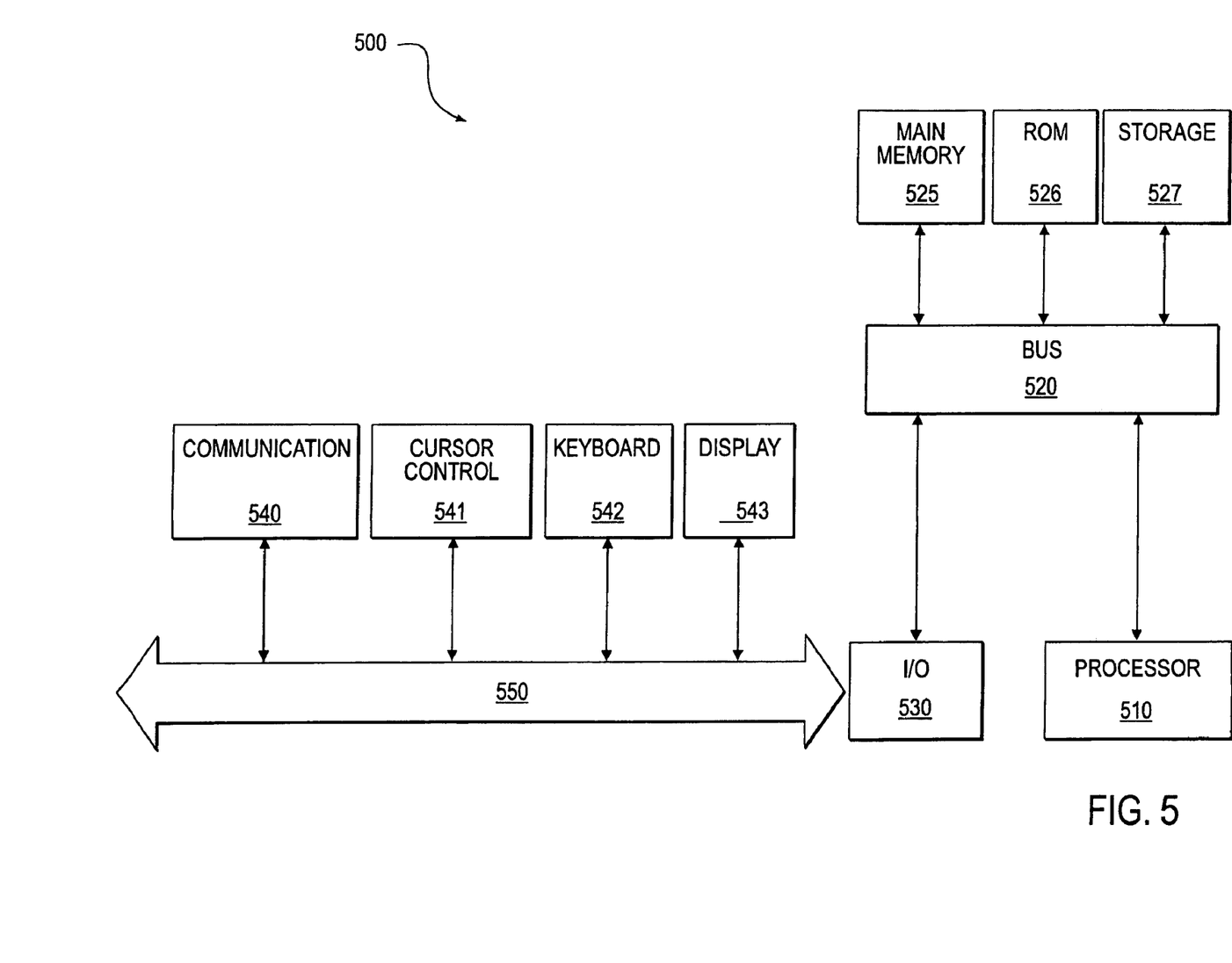
FIG. 5 illustrates an exemplary computer architecture for use with the present system, according to one embodiment of the invention.

FIG. 5 illustrates an exemplary computer architecture for use with the present system, according to one embodiment of the invention. Computer architecture 500 can be used to implement a user/leecher 201, a peer/tracker 211, a peer/seed 212, a peer 213, a content source 210, or a certification authority 221 of FIG. 2. One embodiment of architecture 500 comprises a system bus 520 for communicating information, and a processor 510 coupled to bus 520 for processing information. Architecture 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Architecture 500 also may include a read only memory (ROM) and/or other static storage device 526 coupled to bus 520 for storing static information and instructions used by processor 510.

A data storage device 527 such as a magnetic disk or optical disc and its corresponding drive may also be coupled to computer system 500 for storing information and instructions. Architecture 500 can also be coupled to a second I/O bus 550 via an I/O interface 530. A plurality of I/O devices may be coupled to I/O bus 550, including a display device 543, an input device (e.g., an alphanumeric input device 542 and/or a cursor control device 541). For example, web pages and business related information may be presented to the user on the display device 543.

The communication device 540 allows for access to other computers (servers or clients) via a network. The communication device 540 may comprise a modem, a network interface card, a wireless network interface or other well known interface device, such as those used for coupling to Ethernet, token ring, or other types of networks.

Figure 6:
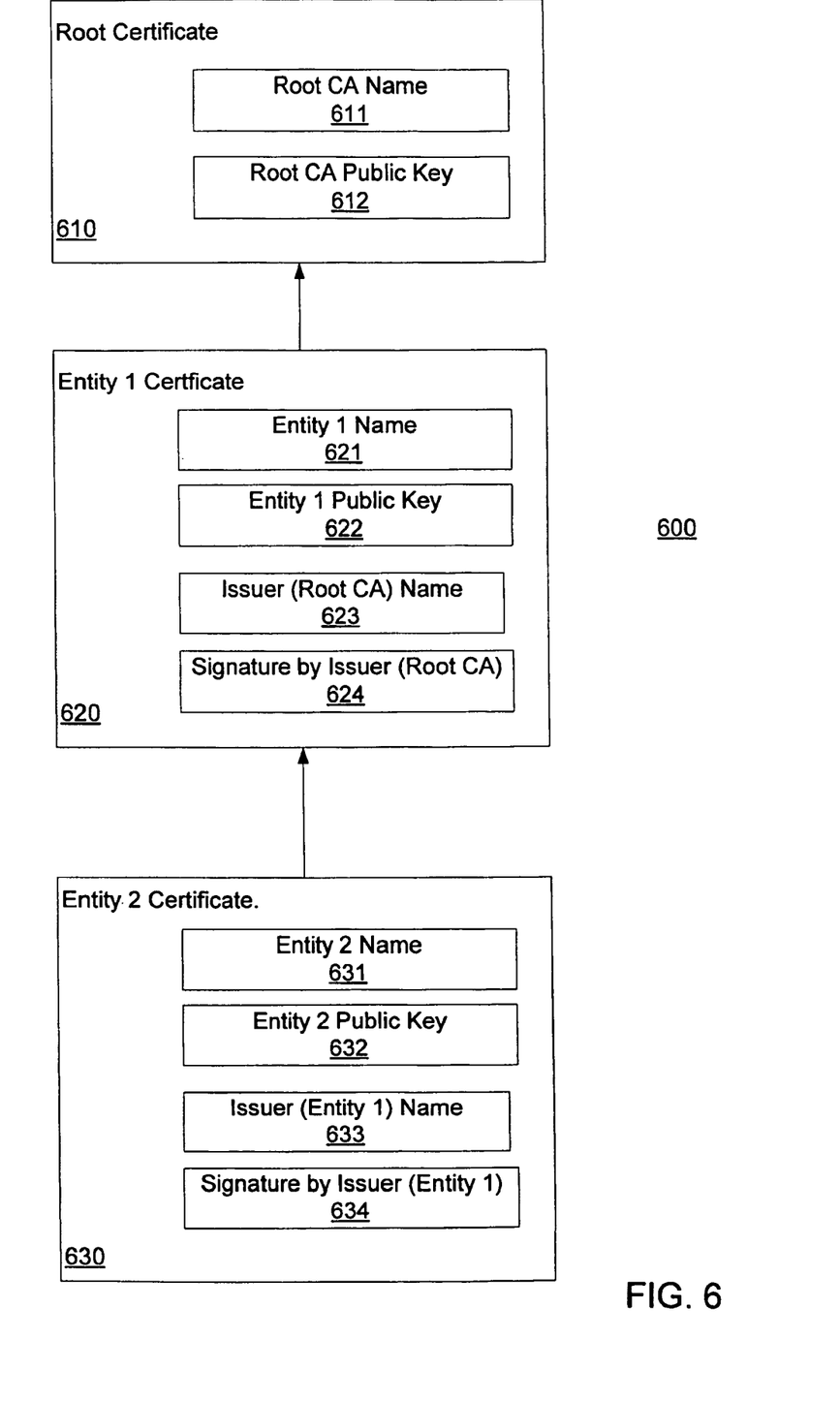
FIG. 6 illustrates a block diagram of exemplary certificates allowing for a chain of trust, according to one embodiment of the present invention.

FIG. 6 illustrates a block diagram of exemplary certificates allowing for a chain of trust, according to one embodiment.

The chain of trust involves an issuing entity to sign subordinate certificates with the issuing entity's private key. For example, a root certificate 610 contains the certification authority's 221 public key 612 and name 611. Entity 1's certificate 620 contains the name of entity 1 621, entity 1's public key 622, the certification authority's name 623 and signature of the issuer 624. Entity 2's certificate 630 contains the name of entity 2 631, entity 2's public key 632, entity 1's name 633 and signature of the issuer (entity 1) 634.

Certificates authorized by the certification authority 221 are signed with the certification authority's 221 private key. The content itself is signed and contains a chain of certificates that allows the user to 1) authenticate the source has an unbroken chain to the certification authority 221, and 2) authenticate the content by verifying it was signed by the source.

Figure 7:
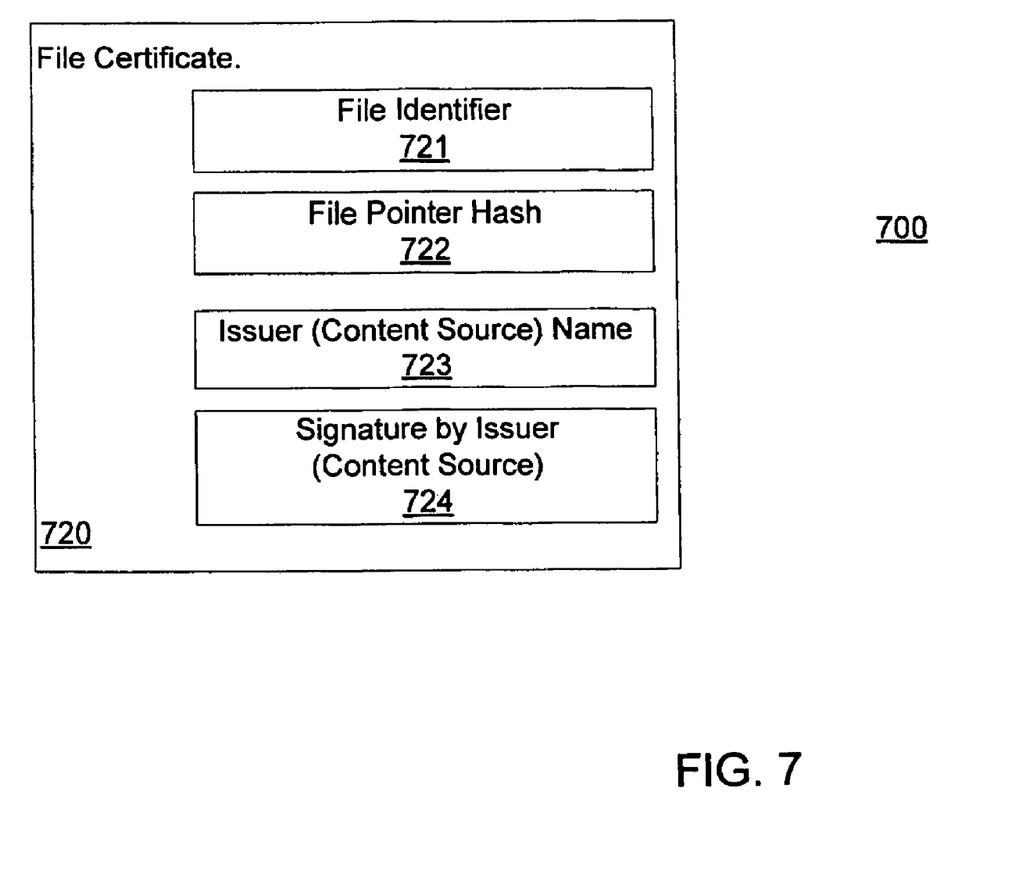
FIG. 7 illustrates a block diagram of an exemplary file certificate, according to one embodiment of the present invention.

The combination of distributing root certificates with authenticating other certificates allows for a chain of trust to exist within peer-to-peer networks, such as network 200 as explained herein. When a content source 210 wishes to distribute content it creates a new file certificate. FIG. 7 illustrates a block diagram 700 of an exemplary file certificate 720, according to one embodiment. A file certificate 720 may contain information identifying the specific file (content). In one embodiment, the identifying information might be a hash of the file 721, a pointer file described above, the hash of a pointer file 722, or any other unambiguous definition of a file. The file certificate 720 also contains information establishing content source 723 and the chain of trust back to the certification authority 221 such as a chain of certificates, such as entity 2 certificate 630, entity 1 certificate 620 and root certificate 610. The file certificate 720 includes a signature 724 of the file certificate issuer.

The content source 210 validates the file certificate 720, preferably by signing it with its private key. The content source 210 distributes the file and the file certificate 720. These may be distributed on a peer-to-peer network, through the Internet or to a device on a peer-to-peer network who will subsequently distribute the content. The file (content) and file certificate 720 do not have to be distributed through the same channels. In one embodiment, the file certificate 720 is placed in a location where a user 201 can easily find it and the file (content) is placed in a location where it can be efficiently transferred such as directly on a seed 212.

When a user (such as user 201) wishes to determine if a file came from a trusted source, the user 201 obtains the file certificate 720, determines if the file came from an acceptable content source 210 and if that content source 210 has an unbroken chain of trust back to the certification authority 221. Since the user 201 already has a root certificate 610 containing the public key 612 contained in the root certificate issued by the certification authority 221, the user 201 can verify if the file certificate 720 returned by the content source 210 is authentic and; therefore, determine that the content source 210 is authentic. In the example where user 201 obtains a file certificate generated by content source 210, the content source certificate must have been signed by the certification authority 221, thus creating a chain of trust from the certification authority 221 to peer 213.

Network 200 allows entities to sign other entities certificates to add its own authenticity certification. However, such additional certification is only allowed after the entity, such as secondary certification authority 222 has contacted the root certification authority 221. According to one embodiment, the root certification authority 221 grants secondary certification authority 222 the right to issue certificates or add signatures to existing certificates. This chain can be continued indefinitely, so long as all links in the chain have at some point been authenticated by the certification authority 221. In alternate embodiments, additional authenticity programs for peer-to-peer networks may be implemented by using secure socket layer (SSL) certificates, or a signed by trusted company certification. In yet another embodiment, the signed certificate accompanies the pointer file described above along with the hash values. In another embodiment, the certificate is transmitted with the desired content.

The description above uses terminology and architecture particular to the BitTorrent means of data exchange, and other means of data exchange that use that architecture. The invention is also applicable to other peer-to-peer networks. In the approach above, the tracker is used to locate peers. In other networks, peers may be located by lists or partial lists of nodes, lists or partial lists of supernodes (that is, nodes that know the locations of many individual nodes), and other mechanisms known to those familiar with the art. This invention applies whether peers are located through $3^{rd}$ party servers (such as eDonkey), through a hierarchial model (such as FastTrack), a flat network (such as Gnutealla), BitTorrent, or any other network architectured. The essential element for this invention is that there exists a means of finding peers, some of which could have the desired content.

BitTorrent allows clients to begin transferring data before the entire file is transferred (that is, before a leecher becomes a seed.) As the validation occurs after the data (or a portion of the data) is transferred, this invention applies to networks regardless of how much content must be received before data is transferred.

In another embodiment, portions of the data are verified through the trust mechanism. In this variation a hash is created for a portion of the file and a pointer is created for the portion of the file containing the file identifier (file name), hash and the portion of the file for which the has applies. In another variations a single pointer file refers to multiple files. The client could validate all files hashes with a single validation operation. Another variation is a combination of the previous two variations. A pointer file may contain any combination of entire or partial files.

In another embodiment, the certificate is applied to a hash of the pointer file rather than the entire pointer file. Because the hash is unique to the pointer file, this is equivalent to applying the certificate to the entire file.

A method and system for establishing trust in a peer-to-peer network has been disclosed. Although the present methods and systems have been described with respect to specific examples and subsystems, it will be apparent to those of ordinary skill in the art that it is not limited to these specific examples or subsystems but extends to other embodiments as well.

I claim:

1. A computer-implemented method for enabling trusted content, the method comprising:
    receiving a certificate associated with content from a peer of a plurality of peers in a peer-to-peer network;
    receiving a pointer file associated with the content, wherein the pointer file includes a hash and an address of a tracker server, and wherein the tracker server mediates and logs communications between the plurality of peers, and wherein the tracker server does not store the content;
    determine the validity of the content by comparing the hash within the pointer file to a block within the content; and
    determine the authenticity of the content by using the certificate to identify the content source.

2. The computer-implemented method of claim 1, wherein determining the authenticity of the content further comprises using a root certificate obtained from a certification authority.

3. The computer-implemented method of claim 2, further comprising determining if the peer has been authenticated by the certification authority.

4. The computer-implemented method of claim 3, wherein the peer did not originally create the content.

5. The computer implemented method of claim 3, wherein the peer belongs to a plurality of peers wherein the plurality of peers have signed the certificate and have been authenticated by the certification authority.

6. The computer implemented of claim 3, wherein the pointer file is a .torrent file.

7. The computer implemented method of claim 3, wherein the root certificate includes a public key of the certification authority.

8. The computer implemented method of claim 3, wherein the certificate includes a public key of the peer providing the certificate.

9. A computer-readable medium having stored thereon a plurality of instructions for enabling trusted content, said plurality of instructions when executed by a computer, cause said computer to perform:
    receiving a certificate associated with content from a peer of a plurality of peers in a peer-to-peer network;
    receiving a pointer file associated with the content, wherein the pointer file includes a hash and an address of a tracker server, and wherein the tracker server mediates and logs communications between the plurality of peers, and wherein the tracker server does not store the content;
    determine the validity of the content by comparing the hash within the pointer file to a block within the content; and
    determine the authenticity of the content by using the certificate to identify the content source.

10. The computer-readable medium of claim 9, wherein determining the authenticity of the content further comprises using a root certificate obtained from a certification authority.

11. The computer-readable medium of claim 10, having stored thereon additional instructions, said additional instructions when executed by a computer, cause said computer to further perform determining if the peer has been authenticated by the certification authority.

12. The computer-readable medium of claim 11, wherein the peer did not originally create the content.

13. The computer-readable medium of claim 11, wherein the peer belongs to a plurality of peers wherein the plurality of peers have signed the certificate and have been authenticated by the certification authority.

14. The computer-readable medium of claim 11, wherein the pointer file is a .torrent file.

15. The computer-readable medium of claim 11, wherein the root certificate includes a public key of the certification authority.

16. The computer-readable medium of claim 11, wherein the certificate includes a public key of the peer providing the certificate.

17. A system for enabling trusted content, the system comprising:
    a processor;
    a bus connected to the processor; and
    memory connected to the bus; wherein the processor executes instructions to receive a certificate associated with content from a peer of a plurality of peers in a peer-to-peer network;
        receive a pointer file associated with the content, wherein the pointer file includes a hash and an address of a tracker server, and wherein the tracker server mediates and logs communications between the plurality of peers, and wherein the tracker server does not store the content;

determine the validity of the content by comparing the hash within the pointer file to a block within the content; and determine the authenticity of the content by using the certificate to identify the content source.

18. The system of claim 17, wherein determining the authenticity of the content further comprises using a root certificate obtained from a certification authority.

19. The system of claim 18, further comprising determining if the peer has been authenticated by the certification authority.

20. The system of claim 18, wherein the peer did not originally create the content.

21. The system of claim 18, wherein the peer belongs to a plurality of peers wherein the plurality of peers have signed the certificate and have been authenticated by the certification authority.

22. The system of claim 18, wherein the pointer file is a .torrent file.

23. The system of claim 18, wherein the root certificate includes a public key of the certification authority.

24. The system of claim 18, wherein the certificate includes a public key of the peer providing the certificate.

* * * * *